(12) United States Patent
Osmani et al.

(10) Patent No.: US 12,544,565 B2
(45) Date of Patent: Feb. 10, 2026

(54) NEURAL IMPLANT BASED ON A CELLULOSE THIN FILM AND CORRESPONDING FABRICATION PROCESS

(71) Applicant: Universität Basel Vizerektorat Forschung, Basel (CH)

(72) Inventors: Bekim Osmani, Basel (CH); Tino Töpper, Freiburg (DE); Bert Müller, Embrach (CH); Carina Luchsinger Salinas, Bättwil (CH); Raphael Guzman, Allschwil (CH); Alois Hopf, Basel (CH); Mahyar Joodaki, Basel (CH)

(73) Assignee: Universität Basel Vizerektorat Forschung, Basel (CH)

( * ) Notice: Subject to any disclaimer, the term of this patent is extended or adjusted under 35 U.S.C. 154(b) by 283 days.

(21) Appl. No.: 18/559,377

(22) PCT Filed: May 6, 2022

(86) PCT No.: PCT/EP2022/062248
§ 371 (c)(1),
(2) Date: Nov. 7, 2023

(87) PCT Pub. No.: WO2022/234066
PCT Pub. Date: Nov. 10, 2022

(65) Prior Publication Data
US 2024/0226540 A1 Jul. 11, 2024

(30) Foreign Application Priority Data

May 7, 2021 (EP) .................................. 21172809

(51) Int. Cl.
*A61N 1/05* (2006.01)

(52) U.S. Cl.
CPC .............................. *A61N 1/0551* (2013.01)

(58) Field of Classification Search
CPC .................................................. A61N 1/0551
See application file for complete search history.

(56) References Cited

U.S. PATENT DOCUMENTS 9,555,583 B1   1/2017   Dirk et al.
9,880,148 B1   1/2018   Son et al.
(Continued)

FOREIGN PATENT DOCUMENTS

EP   3196350 B1   7/2017
EP   3695792 B1   8/2020

OTHER PUBLICATIONS

Yang, Junchuan et al., "Bacterial Cellulose as a Supersoft Neural Interface Substrate", Applied Materials & Interfacees, vol. 10, No. 9, pp. 33049-33059, Oct. 3, 2018.
(Continued)

*Primary Examiner* — Mark W. Bockelman
(74) *Attorney, Agent, or Firm* — Volpe Koenig

(57) ABSTRACT

A novel ultra-thin neural implant (1) is provided that is based on a cellulose thin film (4) featuring an array (2) of electrodes (3). Due to the use of cellulose as the base material, the implant (1) can be safely handled during a microsurgery, despite its high softness and conformability. Such an implant (1) may be useful in numerous applications ranging from electrical stimulation in neural prostheses, electro-stimulated regeneration of neural tissue to accurate recording of nerve signals. The robustness of the implant (1) results from a woven fabric (5) that is integrated in the cellulose carrier thin film (4). Several approaches for enhancing the tissue compatibility of the implant (1) are also provided.

17 Claims, 4 Drawing Sheets

(56) References Cited

U.S. PATENT DOCUMENTS

2010/0185268 A1 7/2010 Fowler et al.
2011/0034938 A1 2/2011 Eijck

OTHER PUBLICATIONS

Zhou Yuhao et al., "Implantable Thin Film, Devices as Brain-Computer Interfaces: Recent Advances in Design and Fabrication Approaches", Coatings, vol. 11, No. 2, p. 204, Jan. 1, 2021.

NEURAL IMPLANT BASED ON A CELLULOSE THIN FILM AND CORRESPONDING FABRICATION PROCESS

CROSS-REFERENCE TO RELATED APPLICATIONS

This application is a 371 National Phase of PCT/EP2022/062248, filed May 6, 2022, which claims priority to European Patent Application No. 21172809.2, filed May 7, 2021, both of which are incorporated herein by reference as if fully set forth.

TECHNICAL FIELD

The present disclosure concerns a conformal neural implant comprising an array of electrodes that is designed for forming a neural interface with living neural tissue.

The present disclosure further concerns a corresponding process for fabricating such a conformal neural implant.

BACKGROUND

Neural interfaces are designed to create links between the nervous system and the outside world, either by electrically stimulating neural tissue or by recording electrical signals from neural tissue. This can be useful, in particular, for treating or assisting people with sensory, motor, or other disabilities of neural function.

Electrical neural stimulation systems have already reached widespread clinical application and neural interfaces that record neural signals are being used to decipher movement intentions of patients with motoric disabilities. The data generated with neural interfaces also enhances basic scientific understanding of brain function and the neurobiology of neural diseases. Striking applications of such neural implants are in the use as a neural prosthesis, for example as a cochlea implant enabling people to hear sounds that they could not hear before, or for spinal cord stimulations to treat chronic neuropathic pain, or as an auditory brain stem implant; neural implants may also be used as so-called nerve conduits for nerve repair.

Currently available implants are often limited in the number of individually addressable electrodes and typically too stiff to allow a highly conformal contact to the complex surface shape of living neural tissue. Another drawback of many state-of-the-art neural implants is that they offer only electrodes deposited on stiff substrates (such as silicon or ceramics for example), which are non-compliant. Even when soft polymer substrate materials such as silicone are used, the mechanical compliance (or conformability) of the resulting implant and neural interface may be limited on a micrometer scale. Compliance/conformability may be understood here as the ability of the implant to closely follow and adapt to the complex 3D-surface shape of the neural tissue to be contacted, without leaving gaps or producing high pressures at certain locations, which could damage the delicate neural tissue.

Moreover, state-of-the-art neural implants are still plagued by insufficient tissue compatibility.

All of the above factors typically lead to a neural interface that is not stable in the long-term, because scar tissue will form around the electrodes, resulting in increased stimulation voltages and also in a loss of spatial resolution of the stimulation. This is highly unsatisfactory, because implantation is a severe intervention that is always associated with secondary health risks. Therefore, it is desirable to use a neural implant over extended periods of time (years to decades in the best case), without the need of repeating the surgery for exchanging the implant.

SUMMARY

Starting from this background, it is an object of the present invention to provide a neural implant with improved tissue compatibility that can form a neural interface with improved long-term stability. Moreover, the inventions aims at providing an implant that is both highly conformal and at the same time suitable for implantation by micro-surgery.

In accordance with the present invention, an implant is provided having one or more of the features disclosed herein, which solves the afore-mentioned problem. In particular the invention proposes an implant as introduced at the beginning, which may be fabricated as described in greater detail below and which, in addition, is characterized in that the neural implant is based on a carrier thin film made from cellulose that carries the array of electrodes and that the carrier thin film is reinforced by a woven fabric.

In other words, it is proposed to form a main body of the neural implant from a thin (typically below 250 μm thickness) cellulose film and to reinforce this delicate and highly compliant thin film by incorporating a woven fabric onto, preferably into, the cellulose thin film.

Very often, implantation is done by minimally-invasive surgery (e.g. by keyhole surgery using sophisticated endoscopes). Cellulose is a biocompatible material that offers a low surface energy and is therefore not sticky, which is highly beneficial for allowing accurate and easy handling of the delicate neural implant, in particular during implantation by a neural micro-surgery. In comparison, thin films formed from polymers such as polydimethylsiloxane (PDMS) are very difficult to impossible to handle accurately during a surgery, because once the surfaces of such a film get in touch with each other, it is very difficult to impossible to separate them without destroying the tender and fragile thin film.

The benefits of the solution for a highly reliable neural implant proposed herein can be applied to neural prosthesis, to neural implants designed for spinal cord stimulations to auditory brain stem implants, to nerve conduits for nerve repair and in particular to neural implants that are designed to actively promote neural tissue regeneration by active electrostimulation of living cells.

With regard to such applications, another important advantage of using cellulose as the base material for the implant is that the adhesion of metal electrodes on cellulose is highly superior to that of many other polymers, in particular PEEK. The underlying reason is the low glass transition temperature $T_g$ of cellulose, which is typically not higher than 90° C., and which may be as low as 70° C. or even 60° C., depending on the amount of plasticizer in the liquid solution used for fabricating the cellulose thin film. Hence it is possible to fine-tune $T_g$, in particular by adding plasticizers to the liquid composition.

One embodiment thus suggests to pattern the electrodes of the implant using a sputtering technique, most preferably by High Power Impulse Magnetron Sputtering (HiPIMS). During the sputter deposition of the metal forming the electrodes, the metal ions heat up the surface of the cellulose thin film and—due to the low $T_g$ of cellulose—can easily penetrate hundreds of nanometer into the cellulose thin film. As a result, a very good adhesion of the metal electrodes on the cellulose thin film can be obtained, because the metal is partly embedded into the thin film during the sputtering (resulting in a solid anchoring).

Suitable materials for the cellulose carrier thin film are thus, in particular, cellulose acetate butyrate (CAB), cellulose acetate phthalate/propionate (CAP) or cellulose acetate (CA).

Yet another advantage of cellulose is that it softens when becoming wet. This has the effect that the implant can be handled easily in a dry environment. After implementation, however, the implant softens in the wet ambient inside the human body which is highly beneficial for improving the conformity of the implant.

The neural implant may have a total thickness in the sub-mm to micrometer range, for example between 50 µm and 500 µm. Preferable for many clinical applications is a total thickness of the implant below 200 µm.

For covering large neural tissue areas, the implant may be designed in the form of a thin ribbon or paddle or patch, for example. However, many other shapes are possible, depending on the particular application. For example, the implant can also be designed as a neural cuff that can be wrapped around a nerve.

The single electrodes of the array may be configured for recording and/or stimulating electrical neural signals via the neural interface.

The major advantage of the reinforcing woven fabric is that it provides mechanical strength to the implant, which protects the delicate carrier thin film from mechanical ruptures and deformations while handling the implant during implantation.

The woven fabric may be irreversibly attached to the carrier thin film (thus forming a part of the implant) and/or (at least partly) embedded into the carrier thin film.

The carrier thin film may also comprise several layers, as will be outlined in greater detail below.

The carrier thin film (in particular as a 1st layer) can be fabricated from cellulose powder, which is first dissolved in a solvent such as acetone or ethyl acetate to form a liquid. Plasticizers may be added to this liquid polymer composition to tune the mechanical properties of the thin film. The liquid composition may then be formed into a liquid thin film by a variety of coating processes such as blade coating, spin coating, roll-to-roll coating, dip coating or the like. After evaporation of the solvent, the liquid film reduces in thickness and solidifies to form the desired solid carrier thin film. The thickness and mechanical properties of the carrier thin film can be adjusted by the choice of the cellulose powder (i.e. in particular by choosing the relative content of acetyl, hydroxyl and butyryl when using CAB or of acetyl, hydroxyl and propionyl content in case of using CAP; manifold compositions with various wt % of these contents are readily available as commercial products) and the amount of solvent added (leading to a more or less viscous liquid composition and hence to a thinner or thicker liquid film and resulting solid thin film).

The woven fabric (2nd layer) may be attached to the carrier thin film and/or it may be embedded into it. One possible approach is to soften the carrier thin film by treating it with a solvent and pressing the woven fabric into the softened carrier thin film to embed it (at least partly) into the film.

On top of the woven fabric another cellulose thin film (3rd layer) may be added to embed the fabric completely inside the carrier thin film. This layer may thus be fused with the first cellulose layer to form the final carrier thin film.

According to the invention, there exist further advantageous embodiments solving the aforementioned problems, which are described below and in the claims For example, it is highly advantageous if the woven fabric comprises silk threads. It has been found, that silk threads are highly compatible with the cellulose of the carrier thin film. In particular, they can be easily embedded into the cellulose thin film, in particular after softening the thin film with a solvent. Moreover, these threads provide excellent mechanical strength without impeding the adaptability and conformity of the implant and they are biocompatible. Silk threads can be obtained from natural sources but are also available now as human-made synthetized threads.

For achieving a mechanical strength of the fabric and hence the overall implant suitable for implantation while maintaining a ultra-small overall thickness of the implant, it is further proposed, that the woven fabric comprises threads with a diameter that is larger than 1 µm and/or smaller than 200 µm, preferably smaller than 50 µm.

A further increase in the mechanical strength is achievable, if the carrier thin film comprises cellulose fibers, preferably with a minimum length of at least 300 µm. Tests have shown, that the use of fibers of the stated minimum length results in an effective enhancement of the tensile strength of the film. The cellulose fibers inside the carrier thin film may be oriented randomly in the film and show lengths in the order of nm to tens of µm. They may be mixed with the mentioned cellulose powder and a suitable solvent, prior to forming the thin film from the resulting liquid composition (composed of the solvent, the cellulose powder and optionally other ingredients such as plasticizers). As will be detailed further below, the fibers can also be oriented in a preferential direction, providing thus a certain texture to the film, which can be controlled during fabrication of the carrier thin film.

The electrodes may be formed from a conductive thin film, in particular from a metal thin film. The conductive thin film may be deposited by different deposition techniques such as magnetron sputtering, evaporation, HiPIMS sputtering or ion implantation techniques. This approach is suitable, in particular, for high density electrode arrays that can deliver a spatially highly accurate electrical stimulation pattern.

Alternatively, depending on the particular application, the electrodes may be formed by conductive fibers, preferably from carbon fibers or gold-coated silk fibers. Following this approach, the conductive fibers may form part of the woven fabric. This approach is particularly suitable when a high conformability of the implant is of utmost interest.

The term electrode may be understood here as a functional term describing an electrically conductive area suitable for the accumulation of charges that can produce an electrical field that is useful for the desired neuro-stimulation or for recording of electrical fields originating from neural tissue (these fields will then induced charges on the electrode, which can be recorded as a signal corresponding to the activity of the neural tissue in the vicinity of the electrode).

According to a particularly preferred embodiment, the carrier thin film forms a surface micro-structure, preferably with a minimum peak-to-valley depth or roughness of at least 0.5 µm, for example in the form of a micro-roughness or in the form of a micro-corrugation. In this case, the electrodes may be deposited on the surface micro-structure, in particular on said micro-corrugation. Furthermore, it is of advantage, if the electrodes cover sidewalls or side-facets of the surface-micro-structure, in particular of said micro-corrugation. This approach enhances significantly the robustness of the implant, because even when the implant is bent or stretched, typically no cracks occur in the top surface of the implant, because the surface micro-structure enhances the compliance of the surface and reduces the mechanical stress.

The micro-structure can be formed directly during fabrication of the carrier thin film. Alternatively, the micro-corrugation can also be formed in a first thin film (which may have a thickness as low as 600 nm) serving as a top layer of the carrier thin film. Again, cellulose is proposed as the material for this particular film.

A suitable process for forming the surface micro-structure is hot embossing using a micro-structured stamp. After hot embossing of the top layer, a thicker base layer, ideally from the same material (cellulose) can be added, thus forming the desired carrier thin film (which will then be composed of multiple films formed on top of each other).

The major advantage of using such a surface micro-structure, in particular a micro-corrugation, is that it provides an increased surface area onto which the thin film forming the electrode can be firmly anchored. Experiments have shown that such a design can result in a robust anchoring of the electrodes onto the carrier thin film without delamination even after hundreds of repetitions of stretch cycles with stretch ratios up to 3% in an aqueous ambient. This is important as the overall implant can be highly conformal (in particular bendable and/or stretchable) such that the thin electrode layer (thickness typically below 200 nm) can be conformal as well, without delaminating from the carrier thin film. In addition, nanometer-thin metal electrodes on micro-structured polymer films develop less cracks upon bending or stretching of the polymer film, as there is a stress release along the edges of the micro-structure.

Using such a surface micro-structure is therefore of interest, in particular, if the implant is to be applied to tissue surfaces with for small radii of curvature, e.g. in the brain. It is speculated that the aspect ratio of the surface micro-structure (defined as the ratio of height to width) and its pitch play a significant role for obtaining crack-free and flexible electrodes. An aspect ratio of >1 has been found to be beneficial for the adhesion of the metal electrodes and will also reduce the stress in the electrode and thus contribute to the long-term stability of the implant.

A surface micro-structure as just described, in particular said micro-corrugation, may be formed in a top surface (facing the neural tissue after implantation) of the carrier thin film by various techniques such as hot-embossing or imprinting or molding, to name a few.

One particularly suitable approach is to form the surface micro-structure by depositing the cellulose thin film on a master structure that shows the negative of the desired micro-structure. This negative may thus be in the form of a (negative) micro-corrugation or simply in the form of a micro-roughness. Demolding of the delicate cellulose thin film from the master is rendered much safer (without ruptures occurring), in case the master is made from polyether ether ketone (PEEK).

On top of the surface micro-structure, the array of electrodes (4th layer) may be formed as a conformal electrically conductive thin film, for example by a suitable coating process such as physical vapor deposition (PVD) or chemical vapor deposition (CVD). Structuring can be achieved by using shadow masks or wet or dry etching techniques. Suitable materials for the electrode layer are metals such as gold (Au) or platinum (Pt). A thin adhesion promotion layer of titanium (Ti) may be beneficial for promoting the adhesion of these materials on the cellulose thin film.

For enhancing the adhesion and increasing the total surface of the surface micro-structure, it is further proposed that the surface micro-structure, in particular said micro-corrugation, shows an aspect ratio (e.g. height/depth vs. width) of at least 1:1, preferably of at least 5:1. The term aspect ratio may be understood herein as describing the ratio of height to width, for example of a micro-pillar as part of the micro-corrugation. The size range for the lateral dimensions has been found to provide a good compromise between an easy reproduction of the micro-structure, in particular by molding, and a sufficient increase in surface area as compared to a non-structured surface.

Moreover, it is also of advantage for a robust design of the neural implant if the micro-corrugation shows lateral dimensions that are larger than 500 nm but smaller than 50 µm.

According to another embodiment, it is further proposed that the carrier thin film is perforated by micro-sized perforations. Equipping the implant with such micro-perforations is advantageous, because the softness, flexibility and compliance of the implant is improved, in particular if the micro-perforations are formed as micro-through-holes which run through the complete cross-section of the carrier thin film. As a result, the physical contact to the neural tissue can be improved.

The micro-perforations can be formed rapidly and efficiently by a laser ablation process, preferably using a femto-second laser, or by applying a suitable cutting stencil on the fabricated carrier thin film.

In case a conductive thin film forms the electrodes of the implant, it is highly preferable when this thin film covers sidewalls of the described micro-perforations. This is because by patterning the electrodes in such a way, conductive vias can be formed. These vias may thus electrically connect the electrodes placed on a front side of the implant to an electrical interconnection layer on the rear of the implant. The proposed interconnection layer may be insulated from the outside world (for example by embedding it into the carrier thin film) and it may be connectable to an electronic unit designed for driving and/or reading out the electrode array.

According to yet another advantageous embodiment of the implant, it is highly desirable if the electrodes of the implant are covered by a 3D-matrix of intertwined nano- to micro-scaled fibers. Preferably, these fibers can also be made from cellulose. The 3D-matrix can serve, in particular, as a scaffold for promoting the adhesion of living cells on the implant.

Another proposal that results in a dense an highly reproducible 3D-matrix is to deposit the fibers by an electrospinning process, which will be described in greater detail below.

The diameter of fibers comprised in the 3D-matrix may thus be below 20 µm, or even 10 µm and a length of some single fibers (but not necessarily of all fibers) may be at least 100 µm. Of course, other fibers with different diameters/length may also be present in the 3D-matrix.

In addition, in the 3D-matrix, the orientations and/or length of the fibers may be randomly distributed. As will be outlined below, however, a preferential direction of the fibers of the 3D-matrix can also be defined.

In principal, the diameter of the fibers can range from nanometers to micrometers depending on the particular application. Due to the interlacing between individual fibers, a fabric of randomly intertwined fibers can be obtained. The matrix can therefore soak up water and other liquids and thus serve as a moisture or liquid reservoir.

The 3D-network or matrix formed by micro- to nano-sized polymer fibers (5th layer) may thus be added on top of the electrode array, to improve the tissue compatibility of the implant.

The advantages of the 3D-matrix or -network are manifold: The 3D-matrix tremendously increases the surface area to be brought in touch with living tissue. This improves the adhesion of cells on the matrix and hence on the implant. The 3D-matrix can take up water and other liquids and also bioactive substances such as a bioactive agent, in particular a drug, for example an antiphlogistic agent or an agent enhancing cell growth. Such bioactive substances may be released from the 3D-matrix, after implantation of the implant. The 3D-matrix can also provide an environment with sufficient humidity that is suitable for promoting the growth of living cells on the network. By enhancing the growth of cells on the network, the tissue compatibility of the implant/of the neural interface can be significantly improved. Moreover, by promoting the growth of neural tissue on the implant, the matrix can improve the efficiency of the neural interface and thus of the neural stimulation and/or recording.

Multiple experiments have proven that living cells can be particularly well grown on a network of nano-sized cellulose fibers. Hence, according to one particular embodiment, it is suggested that the matrix comprises such fibers.

Finally, as a top coating (6th layer), an aqueous solution of cellulose may be applied on the 3D-matrix and solidified on and linked to the 3D-matrix by a drying process. By this approach, it is possible to embed bioactive substances such as an agent or the like, which have been added to the aqueous solution, into the network. After implanting the implant into the human body, these bioactive substances can then be released from the 3D-matrix to promote the growth of cells on the implant and thereby to improve the tissue compatibility of the overall implant.

It is therefore suggested, that a bioactive substance, such as an agent and/or a drug, in particular a bioactive substance promoting cell growth, is embedded in the 3D-matrix of fibers. In this case, it is highly preferable if the bioactive substance is releasable from the 3D-matrix after implantation of the implant (i.e. in a wet ambient).

According to another embodiment, the 3D-matrix may be covered by a layer of methylcellulose. This layer, which may be applied as a liquid coating to the 3D-matrix, can have a thickness in the µm to mm range, and can be firmly bound to the matrix by a drying process. This final surface layer offers the advantage that methylcellulose can take up water inside the human body. As a result, the outer surface of the matrix in direct contact with the living tissue is rendered ultra-soft. This effect can thus increase the conformability of the neural interface on a micrometer- to nanometer-scale.

According to another embodiment, the carrier thin film comprises polydimethylsiloxane (PDMS) that is functionalized with thiol-groups and/or thiol-functionalized cellulose. The advantage of providing thiol groups is that the adhesion of metals such as Ti or Au (which can serve as the electrode material) on the carrier thin film can be significantly enhanced, in particular when using cellulose as the base material for the carrier thin film. This technical feature therefore can result in an improved adhesion of the electrodes on the carrier thin film.

Concerning the woven fabric, this fabric may be made from two layers of threads, the layers being interwoven with each other in a regular pattern. For example, the fabric may comprise warp threads that run in parallel to each other, and at least one long weft thread that is interwoven with the warp threads, for example in a meandering fashion.

Alternatively or additionally, it is also suggested that the woven fabric comprises at least one layer of warp threads aligned along a first direction that is interwoven with a respective corresponding layer of weft threads running along a second direction. Such features can result in a fabric that provides mechanical strength to the implant in multiple directions within the plane of the fabric.

According to a particularly preferred design, the fabric comprises two layers of warp threads. In this case the respective first directions of the warp threads of these two layers may enclose an angle of at least 10°, preferably of at least 30°. Such a design further improves the mechanical robustness of the implant.

In accordance with the present invention, there is also provided a process for fabricating a conformal neural implant, which solves the afore-mentioned problems. In particular there is provided a process as introduced at the beginning, further characterized in that a carrier thin film is formed from a liquid composition of cellulose, and a woven fabric is attached to and/or embedded into the carrier thin film.

It is of particular advantage, when this process is adapted to form features of the resulting implant as described before or as defined by one of the claims directed towards a neural implant. For example, as has been explained previously, for good adhesion of the electrodes on the cellulose thin film, the electrodes may be deposited as a conductive thin film by a sputtering technique, in particular by HiPIMS, or by an ion implantation technique.

The formation of the carrier thin film may be done by first forming a liquid film from the liquid composition using a suitable coating process, and by drying the liquid film into a solid thin film or gel film, as has been described above.

The fabrication process may be elaborated further by the following features:

As has been explained before, polymer fibers, most preferably cellulose fibers, may be added to the liquid composition, from which the carrier thin film of the implant is formed. Such fibers should preferably show a minimum length of at least 300 µm to have a significant impact on the mechanical properties of the carrier thin film. When mixing such micrometer-sized fibers into the liquid composition, they will be normally oriented in random orientations in the liquid film formed from the composition. However, for many applications, it is advantageous if the fibers are oriented along a preferential direction inside the carrier thin film, because in this case, the mechanical properties, in particular the elasticity, of the film can be rendered anisotropic. This approach can be used to advantage, because, depending on the application, it can be preferable if the carrier thin film is softer in one direction and stiffer in another direction. For example, imagine the case of using the implant as a nerve conduit, which is wrapped around a nerve to repair it; in this case, the implant will benefit from strengths along the direction of the nerve but should be softer in the lateral direction.

Therefore, according to a particular embodiment, it is suggested that when such fibers are embedded into the carrier thin film, they may be oriented in a preferential direction by heating up the film (in particular above its glass transition temperature) and applying a mechanical strain to the carrier thin film. The heating renders the film soft and allows the fibers to orientate along the preferential direction, which is dictated by the direction of the applied mechanical strain. After cool down, the fibers inside the film will maintain the preferential direction. As a result, the desired anisotropic mechanical behavior of the thin film is achieved.

This approach is also applicable, in case the front side of the implant is covered by a 3D-network or 3D-matrix of intertwined fibers, as has been described above. In other words, by heating up the carrier thin film and applying a mechanical strain to the film, the fibers of the 3D-matrix on top of the carrier thin film can also be orientated in the preferential direction. This can be achieved, for example, by stretching the implant in one direction, heating it up to the $T_g$ of the carrier thin film and applying a pressure to fix the resulting preferential direction of the fibers of the 3D-matrix. As a result, the surface of the implant defined by the 3D-matrix can show a texture. This texture can help the healing and regeneration of neural tissue, to which the implant has been applied to, because the neural tissue then tends to grow along the preferential direction of the texture.

In many practical situations, the neural implant will need to be adapted with high conformability to the complex 3D-shape of a living neural tissue. To facilitate a highly conformal contact of the neural implant to the tissue, one particular embodiment suggests that the implant may be thermoformed into a particular non-planar 3D-shape. In other words, the implant may be (thermo-)pre-formed into a certain geometry, for example into a cylindrical shape that is adequate for spinal cord stimulations.

Thermoforming may be achieved most easily by heating up the carrier thin film (in particular above its glass transition temperature) and by deep-drawing the carrier thin film onto a model that forms/defines the non-planar 3D-shape.

This approach can be used to great advantage in particular, if the model has been fabricated based on 3D-data that have been obtained by a 3D-scan of a living tissue. For example, high resolution 3D-printing techniques are readily available for fabricating such a model, and the 3D-data can be obtained from a computed tomography (CT-) or magnetic resonance imaging (MRI-) scan of the neural tissue of interest to which the implant is to be applied.

It is also possible to form a surface micro-structure (in particular as described before) on a front side of the carrier thin film, preferably by molding from a PEEK-master or by hot-embossing, and an array of electrodes may be patterned on the surface micro-structure. If a 3D-matrix of fibers is used, this layer may be added on top of the electrodes.

Alternatively or additionally (depending on the requirements of the intended application of the implant) it may be provided that prior to the deposition of the array of electrodes, micro-perforations are formed in the carrier thin film. This may be done in particular, as has been described above, in such a way that when patterning a conductive thin film forming the electrodes, electrically conductive vias are formed by covering sidewalls of the micro-perforations with the conductive thin film.

Finally, also as an additional or alternative process feature, it may be provided that a 3D-matrix of micro- to nano-scaled fibers (which may have features as described above) is deposited on the array of electrodes of the implant, most preferably by an electrospinning process. In this case, a bioactive substance may be embedded in the 3D-matrix, i.e. in particular in the fibers forming the matrix.

Electrospinning is a versatile technique for the formation of continuous fibers with diameters ranging from micro- to nanometer scales. In electrospinning, a polymer solution or polymer melt is dispensed as a charged liquid jet that is formed from a nozzle in the presence of an electric field. For example, a 3D-matrix of cellulose fibers may be produced on a substrate by dispensing a liquid composition comprising a solvent and the polymer base material (e.g. cellulose powder) from a dispensing nozzle using a high-voltage source (e.g. 20 kV). As the solvent in the jet exiting the nozzle evaporates, the polymer solidifies and is harvested as an interconnected 3D-network or 3D-matrix (sometimes also referred to as a membrane or mat) of randomly arranged and intertwined fibers on the substrate surface. The high porosity and surface area of the resulting nonwoven electrospun "mats" make these fiber networks attractive in various fields for instance in pharmaceutical applications for drug delivery systems, biomedical applications such as tissue engineering and wound dressing, filtration systems, and smart textiles, to name a few.

Electrospinning allows accurate control of both the thickness and length of the fibers produced, which can be adjusted by the viscosity of the liquid composition, the applied voltage, flow rate of the liquid, temperature and other parameters. This process allows, as an example, to cover a 4" wafer rapidly within 30 seconds with a layer of randomly oriented fibers, that form a 3D-network or -matrix. Due to the random jet formation process, the resulting network or matrix consists of millions of micro- to nano-sized fibers (depending on the concrete process parameters) that are intertwined. The resulting 3D-matrix can cover the wafer with a uniform thickness and is soft and compressible, because air pockets are enclosed between the fibers. These air pockets or pores may have sizes ranging from a few microns to tens of microns and can also be adjusted by tuning the process parameters.

Of course, such a fabricated 3D-matrix may then be customized to a desired shape of the implant, simply by cutting it. It has been found that such a matrix provides an excellent ambient in which cells can be cultivated over extended periods of time. One reason is the complexity and large size of the surface of the matrix. As will be described in greater detail below, the 3D-matrix can also show anisotropic mechanical properties, in particular an anisotropic stretching behavior/elasticity.

In particular, it has been found that electrospinning of cellulose esters is possible with the following three setups: dry-needle electrospinning, melt electrospinning and disc-electrospinning (which may be all understood here as electrospinning processes). Suitable parameters that have been identified for the electrospinning procedure of a fiber network consisting of cellulose fibers are as follows: voltage: 20 kV; nozzle-to-substrate distance: 23 cm; the flow rate Q at the nozzle may be Q1=0.3 ml/min/Q2=0.8 ml/min/Q3=3.3 ml/min, depending on the desired thickness of the fibers of the 3D-matrix.

The neural implants proposed herein may be applied to various use-cases: For example, the implant may be used as a neural stimulation electrode, in particular for electrical neuro-stimulation of cerebral tissue or neural tissue of the spinal cord; it may be used for recording of electrical signals from neural tissue; it can be designed as a cochlea-implant, a nerve-cuff or the like. Finally, the implant may be useful for the treatment of neurodegenerative diseases such as Alzheimer's disease, chronic neuropathic pain, Parkinson's disease and epilepsy.

Preferred embodiments of the present invention shall now be described in more detail, although the present invention is not limited to these embodiments: for those skilled in the art it is obvious that further embodiments of the present invention may be obtained by combining features of one or more of the patent claims with each other and/or with one or more features of an embodiment described or illustrated herein.

BRIEF DESCRIPTION OF THE DRAWINGS

With reference to the accompanying drawings, where features with corresponding technical function are referenced with same numerals even when these features differ in shape or design.

DETAILED DESCRIPTION

Figure 5:
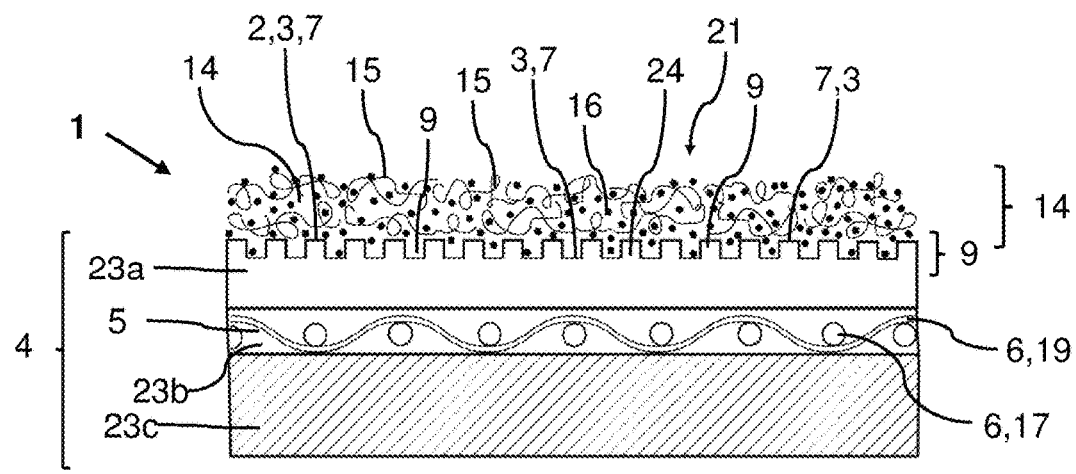
FIG. 5 illustrates a cross-sectional side view of a neural implant according to the invention, FIG. 6 portrays a SEM-image of a 3D-fiber network or -matrix fabricated by an electrospinning process and patterned on top of an electrode array, as indicated by FIG. 5, FIG. 7 portrays a SEM-image of a suitable surface microstructure formed in a top layer of the cellulose carrier thin film, as schematically indicated in FIG. 5.

FIG. 5 shows a first example of a neural implant 1 according to the invention. The implant 1 comprises several electrodes 3 that are arranged as an array 2 for forming a neural interface with living neural tissue and/or living cells to achieve effective electrostimulation and is based on a carrier thin film 4 made from cellulose.

As visible in FIG. 5, the carrier thin film 4 carries the electrodes 3 and is reinforced by a woven fabric 5 to provide additional mechanical strength to the implant 1. The advantage of using cellulose as the base material for the carrier thin film 4 is that this material is biocompatible and not sticky. Hence, the thin film 4 can still be handled safely, in particular during a micro-surgery, without destroying or rupturing the film 4, if the film 4 is very thin (e.g. 150 µm). Due to this material choice, the implant 1 is also highly conformal and compliant such that it can be adapted to various complex 3D-shapes of a tissue to be contacted.

Figure 9:
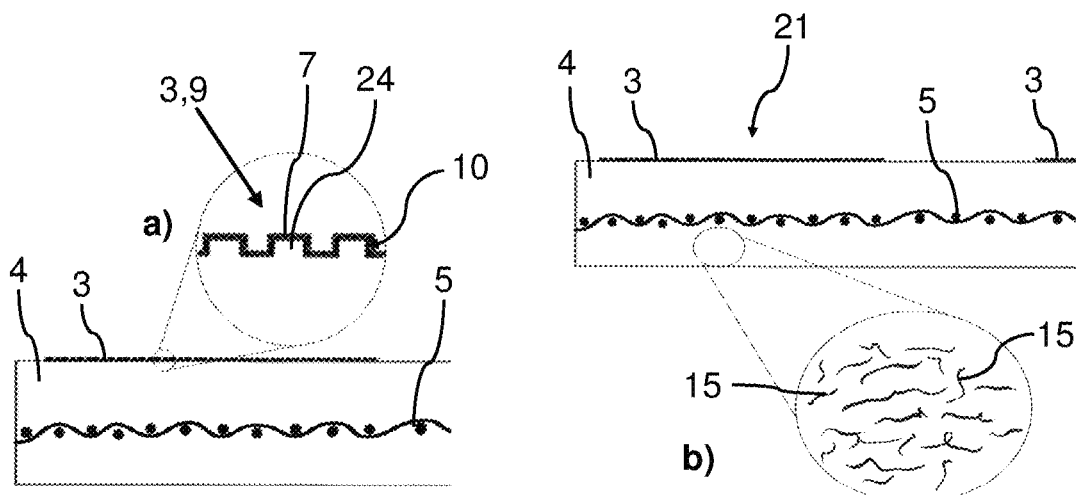
FIG. 9 illustrates details of a neural implant according to the invention.

As displayed in the detail b) of FIG. 9 showing another neural implant 1 according to the invention, it is also possible to additionally embed cellulose fibers 15 into the carrier thin film 4 for improving its mechanical properties, in particular its ability to stretch repeatedly without ruptures.

Figure 1:
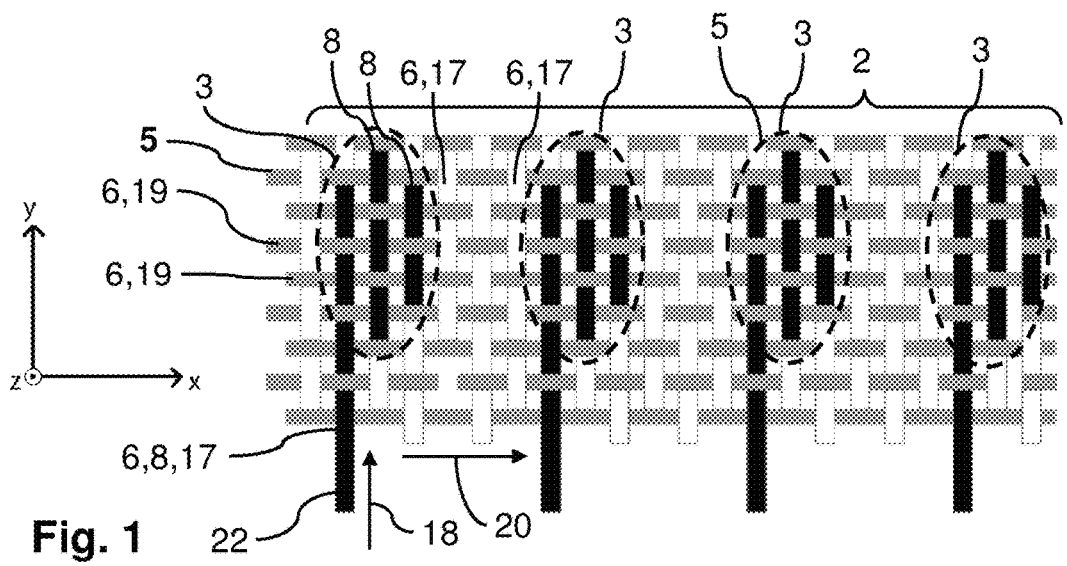
FIG. 1 shows a schematic top view on a woven fabric used to reinforce a neural implant according to the invention.
Figure 8:
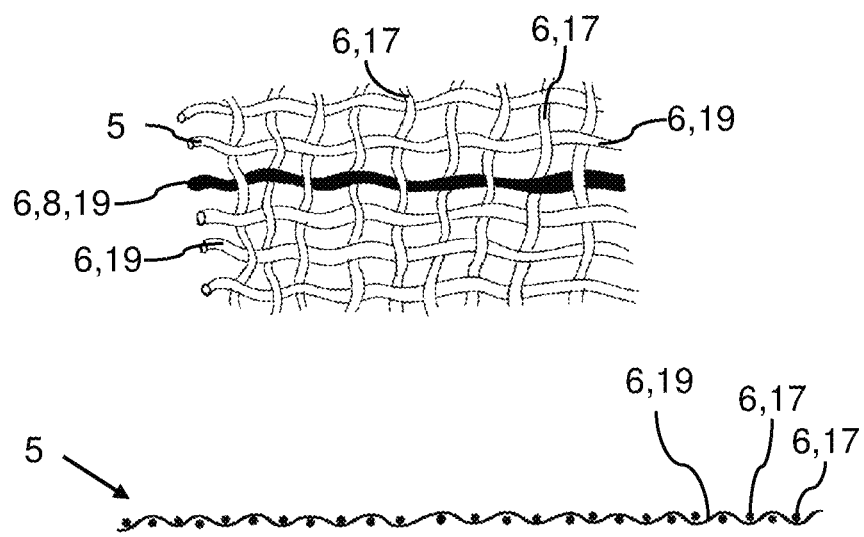
FIG. 8 shows a possible woven fabric with integrated conductive thread in a top view and side view, respectively.

The woven fabric 5 displayed in FIG. 5 is obtained from micro-sized silk threads 6 with a diameter of approximately 20 µm by regularly weaving a certain number of warp threads 17 (which are typically held stationary in tension on a frame during the weaving) with a number of weft threads 19; the fabric 5 can thus have a structure similar to that displayed in FIG. 8 or FIG. 1. The fabric 5 thus contains two layers of threads 6 (namely a layer of warp threads 17 and a layer of weft threads 19), which are interwoven with each other in a regular pattern, as visible for example in FIG. 8.

Figure 2:
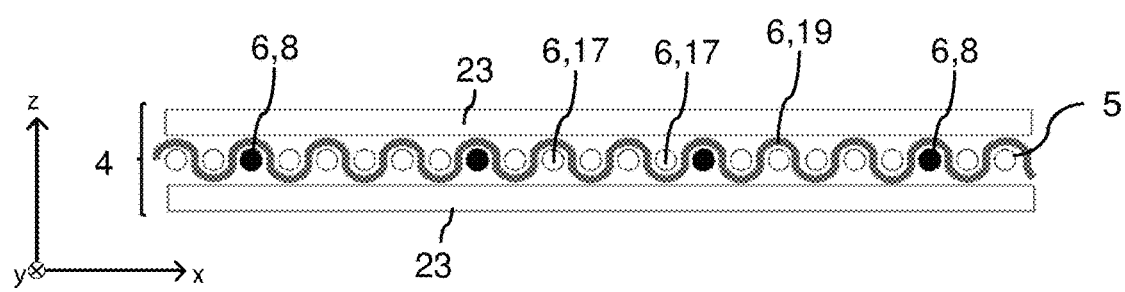
FIG. 2-4 show schematic cross sections through respective neural implants according to the invention, in which a woven fabric similar to that of FIG. 1 is already integrated into the implant.
Figure 3:
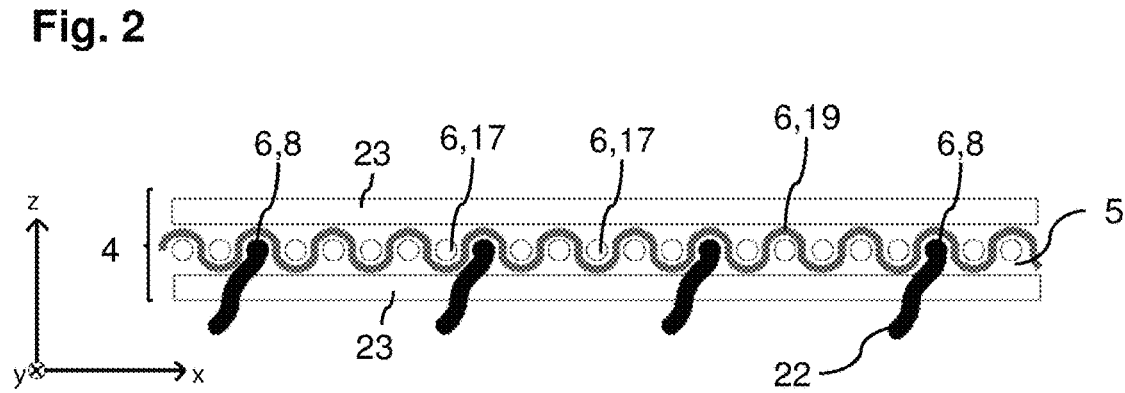
Figure 4:
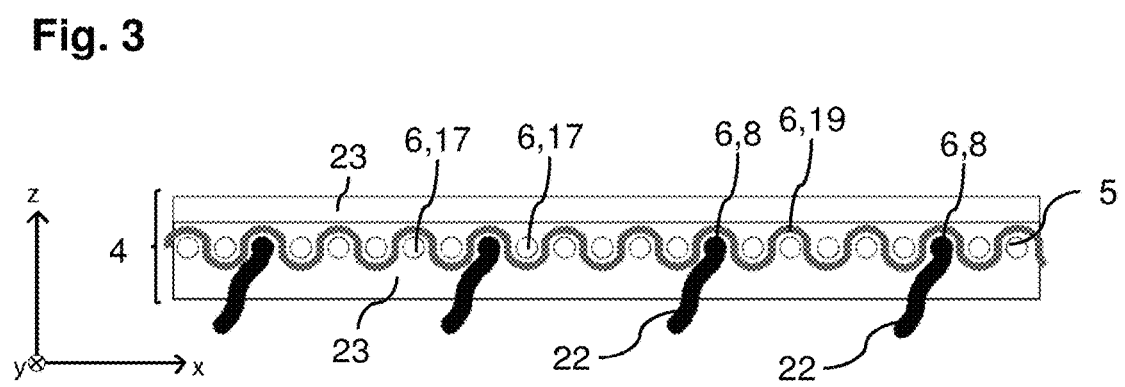

In the example of FIG. 5, the woven fabric 5 is embedded into the carrier thin film 4. This may be achieved in various ways, for example as illustrated in FIGS. 2 to 4, in which the fabric 5 is sandwiched between two cellulose thin films 23, as in FIGS. 2 and 3, or fully embedded in a bottom cellulose thin film 23 with another top cellulose thin film 23 attached and fused with the bottom cellulose thin film 23, as in FIG. 4.

As displayed in FIG. 1, the electrodes 3 of the implant 1 may be actually formed from conductive threads 8, which form part of the woven fabric 5. The conductive threads 8 may thus serve for defining a certain active area of an electrode 3 (indicated by the dashed lines in FIG. 1) for accumulating charges and hence generating a relevant electrical field. In addition, the conductive threads 8 can also serve as electrical connections 22 for electrically contacting said electrodes 3. Another possible implementation suggests to from the electrodes 3 from conductive fibers 8, in particular from carbon fibers.

In the example of FIG. 5, however, the electrodes 3 are defined by an conductive thin metal film 7. For improving the adhesion of this metal film 7 on the soft and also slightly stretchable cellulose carrier thin film 4, a surface microstructure 9 has been patterned into the carrier thin film 4 on the front side 21 of the implant 1 (facing the tissue after implantation of the implant 1) and the metal film 7 has been deposited onto the micro-structure 9 with an intermediate adhesion promotion layer of titanium.

Figure 7:
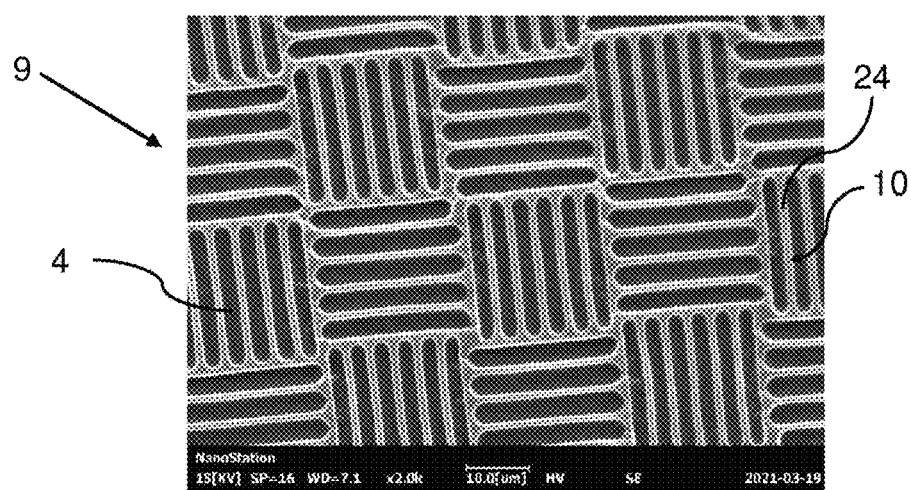

The micro-structure 9 of the implant 1 can have a pattern as displayed in the scanning electron microscope (SEM) image of FIG. 7, with ridges 24 defining sidewalls 10 or side-facets 10 as well as valleys (located in between the ridges) and hence a certain aspect ratio of the structure 9.

As displayed by the detail a) in FIG. 9, the micro-structure 9 can have the form of a micro-corrugation, for example. Preferably, the electrodes 2 should be patterned on top of the micro-structure 9 such that they also cover the sidewalls 10. The minimum preferably peak-to-valley depth of the micro-structure 9 should be at least 500 nm for achieving a significant enhancement in the adhesion of the electrode 3 on the carrier substrate 4. The micro-structure 9 however does not need to show a regular micro-corrugation but can also be defined as an irregular surface-roughness. Alternatively or additionally, the carrier thin film 4 can also be functionalized with thiol-groups for further promoting the adhesion of the electrodes 3.

The implant according to the embodiment shown in FIG. 5 is fabricated by the following steps: The micro-structure 9 is obtained by demolding a thin cellulose thin film 23a (serving as the top layer in the final implant 1—cf. FIG. 5) from a master structure fabricated from polyether ether ketone (PEEK). This may be done by mixing a liquid composition comprising a solvent such as acetone or ethyl acetate with cellulose powder (and optionally plasticizers) and applying the composition as a liquid coating onto the master. After the solvent evaporates, a solid cellulose thin film 23 will form that features the micro-structure 9 on its front side 21.

Prior to demolding, however, the rear side of the top cellulose thin film 23a may then be softened again by treating it with a solvent (e.g. applied by spraying) and the woven fabric 5 may be pressed into the thin film 23a by using pressure (e.g. applied by a hand-roll). Afterwards, the (at least partly) embedded fabric 5 may be further covered by a liquid cellulose thin film, forming the middle cellulose thin film 23b illustrated in FIG. 5. Finally a thicker base layer of another cellulose thin film 23c may be added. Hence, in the final implant 1, the carrier thin film 4 may actually comprise several cellulose or other thin films combined (e.g. by fusing, gluing, thermo-pressing) into a compact and still ultra-thin (typically below 200 µm) and hence highly compliant carrier thin film 4 that is based on cellulose as the base material.

Figure 12:
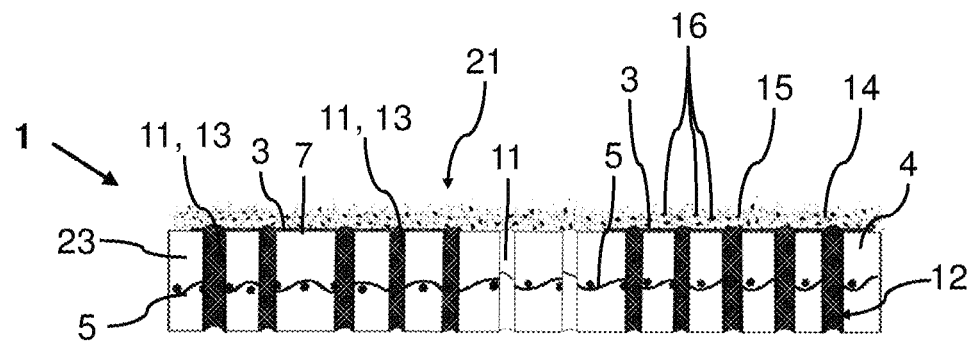

Another important improvement of the properties of the implant 1 is achieved by covering the electrodes 2 and the complete front side 21 of the implant 1 with a layer of intertwined nano- to micro-scaled fibers 15 that form a 3D-matrix 14, as illustrated in the examples of FIGS. 5 and 12. On the one side, such a 3D-matrix 14 can render the front side 21 of the implant 1 compliable on a sub-micrometer level; on the other side, the matrix 14 is advantageous, because it can promote the adhesion of cells on the implant 1, and because it can be loaded with bioactive substances 16, which are then releasable from the 3D-matrix 14, as soon as the implant 1 has been transferred into the human body (cf. the embodiment of FIG. 12).

Figure 6:
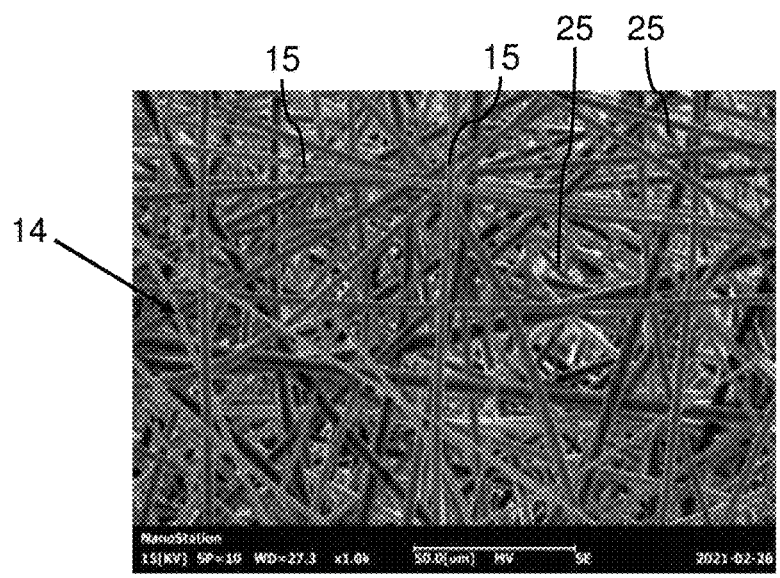

As visible in the (schematic and not true-to-scale) illustrations of FIGS. 5 and 12, but also in the SEM-image of FIG. 6 showing a practical implementation of such a 3D-matrix by micro-sized cellulose fibers 15 deposited by electrospinning and forming pores 25 (as free space in between fibers 15) in the order of µm, the fibers 15 forming the 3D-matrix 14 may have various shapes such as linear or curled. Characteristic, however, is that the fibers are entangled such that they form a sort of compressible (and hence conformal) micro-sized mat or fiber network (the overall thickness of the 3D-matrix layer may be in the order of a few µm up to 1 mm, depending on the particular application). As illustrated in FIGS. 5 and 12 and visible in FIG. 6, pores 25 are thus created by the 3D-matrix 14 in various heights above the top surface of the upper cellulose thin film (e.g. film 23*a* in FIG. 5).

Figure 10:
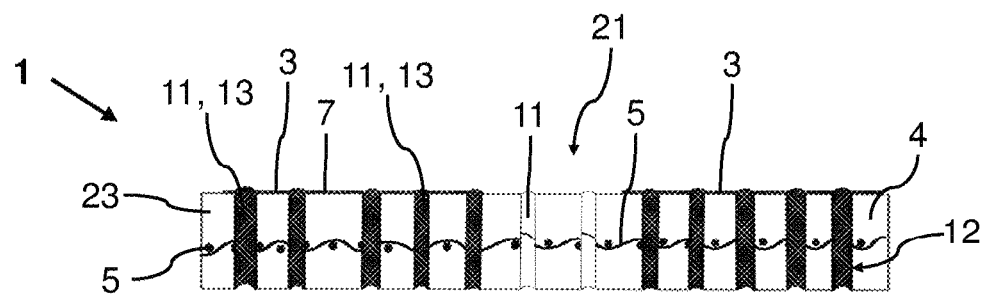
FIG. 10-12 illustrate several steps for fabricating another neural implant according to the invention, featuring conductive vias.
Figure 11:
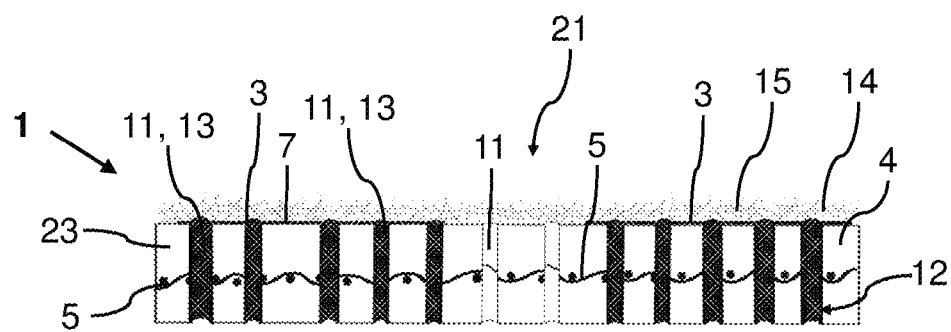

FIGS. 10 to 12 show another example of a neural implant 1 according to the invention. Again, the implant 1 comprises several electrodes 3 that are arranged as an array 2 on a cellulose carrier thin film 4. However, prior to patterning of the electrodes, the carrier thin film 4 was perforated by a laser drilling process to form micro-sized perforations 11 in the form of through-holes.

By patterning the electrodes 3 after formation of the micro-sized perforations 11, electrically conductive vias 13 have been formed (cf. FIG. 10), as the electrical thin film 7 forming the electrodes 3 also covers the sidewalls 12 formed by the through-holes. Such vias 13 may then be used for electrically contacting the electrodes 3 on the front side 21 using an electrical interconnection layer (not shown in the Figures) located on the rear side of the implant 1 opposite to the front side 21, which may be electrically connected (e.g. by simple attachment) to the vias 13.

As can be seen in FIG. 12, a bioactive substance 16 has been loaded into the 3D-matrix 14 deposited on the front side 21 of the implant 1 by soaking the matrix 14 in a liquid containing the substance 16. This substance 16, which may a drug or an agent, can then be released in the human body, in particular for promoting tissue regeneration.

A novel ultra-thin neural implant 1 is proposed that is based on a cellulose thin film 4 featuring an array 2 of electrodes 3. Due to the use of cellulose as the base material, the implant 1 can be safely handled during a micro-surgery, despite its high softness and conformability. Such an implant 1 may be useful in numerous applications ranging from electrical stimulation of nerve signals in neural prostheses, electro-stimulated regeneration of neural tissue to accurate recording of nerve signals. The robustness of the implant 1 results from a woven fabric 5 that is integrated in the cellulose carrier thin film 4. Several approaches for enhancing the tissue compatibility of the implant are also proposed, in particular by adding a 3D-matrix 14 of entangled fibers 15.

LIST OF REFERENCE NUMERALS

1 neural implant
2 array (of 3)
3 electrode
4 carrier thin film
5 woven fabric
6 thread (of 5)
7 conductive thin film
8 conductive fibers or threads
9 surface micro-structure
10 sidewall/side-facet (of 9)
11 micro-perforation
12 sidewall (of 11)
13 conductive via
14 3D-matrix
15 fibers
16 bioactive substance
17 warp thread
18 first direction (of 17)
19 weft thread
20 second direction (of 19)
21 front side (of 1/4)
22 electrical connection
23 cellulose thin film
24 ridge (of 9)
25 pore

The invention claimed is:

1. A conformal neural implant (1) comprising:
   an array (2) of electrodes (3) for forming a neural interface with living neural tissue,
      a carrier thin film (4) made from cellulose that carries the array (2), and
      a woven fabric (5) that reinforces the carrier thin film (4).

2. The conformal neural implant (1) according to claim 1, wherein the woven fabric (5) comprises silk threads.

3. The conformal neural implant (1) according to claim 1, wherein the woven fabric (5) comprises threads (6) with a diameter that is at least one of larger than 1 µm or smaller than 200 µm.

4. The conformal neural implant (1) according to claim 1, wherein the carrier thin film (4) comprises cellulose fibers.

5. The conformal neural implant (1) according to claim 1, wherein the electrodes (3) are formed from a conductive thin film (7),
   or
      the electrodes (3) are formed by conductive fibers (8) or conductive threads (8).

6. The conformal neural implant (1) according to claim 1, wherein the carrier thin film (4) forms a surface micro-structure (9), with a minimum peak-to-valley depth/roughness of at least 500 nm,
   and
      the electrodes (3) are deposited on the surface micro-structure (9).

7. The conformal neural implant (1) according to claim 6, wherein the surface micro-structure (9) at least one of has an aspect ratio of at least 1:1, or
      the surface micro-structure comprises micro-corrugation that have lateral dimensions that are larger than 500 nm but smaller than 50 µm.

8. The conformal neural implant (1) according to claim 1, wherein the carrier thin film (4) is perforated by micro-sized perforations (11), and
- a conductive thin film (7) forming the electrodes (3) covers sidewalls (12) of the micro-perforations (11) such that conductive vias (13) are formed.

9. The conformal neural implant (1) according to claim 1, wherein the electrodes (3) are covered by a 3D-matrix (14) of intertwined nano- to micro-scaled fibers (15), and
- the fibers (15) at least one of:
  - are made from cellulose, and/or
  - are deposited by an electro-spinning process, or
  - have a diameter below 20 μm and a length of at least 100 μm.

10. The conformal neural implant (1) according to claim 9, wherein a bioactive substance (16) is embedded in the 3D-matrix (14) of fibers (15), and
- the bioactive substance (16) is releasable from the 3D-matrix (14) after implantation of the implant (1).

11. The conformal neural implant (1) according to claim 9, wherein at least one of
- a) the 3D-matrix (14) is covered by a layer of methylcellulose,
- b) the carrier thin film (4) comprises polydimethylsiloxane (PDMS) that is functionalized with thiol-groups and/or thiol-functionalized cellulose,
- c) the woven fabric (5) is made from two layers of threads (6), the layers being interwoven with each other in a regular pattern, or
- the woven fabric (5) comprises at least one layer of warp threads (17) aligned along a first direction (17) that is interwoven with a respective corresponding layer of weft threads (19) running along a second direction (20).

12. The conformal neural implant of claim 11, wherein the woven fabric (5) comprises two layers of warp threads (17), having said first directions (17) that enclose an angle of at least 10°.

13. A process for fabricating a conformal neural implant (1), comprising the steps of:
- forming a carrier thin film (4) from a liquid composition of cellulose, and
- at least one of attaching a woven fabric (5) is to or embedding the woven fabric into the carrier thin film (4).

14. The process for fabricating the conformal neural implant (1) according to claim 13,
- wherein polymer fibers are embedded into the carrier thin film (4) and oriented in a preferential direction by heating up the film (4) and applying a mechanical strain to the film (4).

15. The process for fabricating the conformal neural implant (1) according to claim 13,
- wherein the implant (1) is thermoformed into a non-planar 3D-shape, by heating up the film (4) and deep-drawing the film (4) onto a model that forms the non-planar 3D-shape.

16. The process for fabricating the conformal neural implant (1), according to claim 13, further comprising:
- forming a surface micro-structure (9) on a front side (21) of the carrier thin film (4), and at least one of
- a) patterning an array (2) of electrodes (3) on the micro-structure (9),
- b) prior to deposition of the array (2) of electrodes (3), forming micro-perforations (11) in the carrier thin film (4),
- or
- c) depositing a 3D-matrix (14) of micro- to nano-scaled fibers (15) on the array (2) of electrodes (3).

17. The process for fabricating the conformal neural implant of claim 15, wherein the model is fabricated based on 3D-data obtained by a 3D-scan of a living tissue.

* * * * *